United States Patent
Seong et al.

(10) Patent No.: US 8,920,954 B2
(45) Date of Patent: Dec. 30, 2014

(54) BATTERY STORAGE TRAY

(75) Inventors: Jaeil Seong, Yongin-si (KR); Soonki Woo, Yongin-si (KR); Kiyuon Jeon, Yongin-si (KR); Sehan Kim, Yongin-si (KR); Hideaki Yoshio, Yongin-si (KR)

(73) Assignee: Samsung SDI Co., Ltd., Gyeonggi-Do (KR)

(*) Notice: Subject to any disclaimer, the term of this patent is extended or adjusted under 35 U.S.C. 154(b) by 662 days.

(21) Appl. No.: 12/971,922

(22) Filed: Dec. 17, 2010

(65) Prior Publication Data
US 2011/0300425 A1    Dec. 8, 2011

Related U.S. Application Data

(60) Provisional application No. 61/352,287, filed on Jun. 7, 2010.

(51) Int. Cl.
*H01M 2/10* (2006.01)
*H01M 6/46* (2006.01)
*H01M 2/00* (2006.01)

(52) U.S. Cl.
CPC ............ *H01M 2/105* (2013.01); *H01M 2/1027* (2013.01); *H01M 2/1061* (2013.01); *H01M 2/1077* (2013.01)
USPC ............. 429/99; 429/155; 429/154; 429/153; 429/152; 429/149

(58) Field of Classification Search
CPC   H01M 2/1027; H01M 2/1061; H01M 2/1077
USPC .................... 429/99, 155, 154, 153, 152, 148
See application file for complete search history.

(56) References Cited

FOREIGN PATENT DOCUMENTS

| CN | 101168392 | 4/2008 |
|---|---|---|
| JP | S63-129962 | 8/1988 |
| JP | 2000-173567 | 6/2000 |
| JP | 2000-353507 | 12/2000 |
| JP | 2003-045390 | 2/2003 |
| JP | 2008-133046 | 6/2008 |
| JP | 2008-260587 | 10/2008 |
| JP | 2009-218077 | 9/2009 |
| JP | 2010-092603 | 4/2010 |
| KR | 1020080036528 | 4/2008 |

OTHER PUBLICATIONS

Office Action dated Mar. 26, 2013 for corresponding JP Application No. 2011-118752.
Office Action dated Aug. 7, 2012 for corresponding KR Application No. 10-2011-0020442.
Extended European Search Report dated Oct. 19, 2011 for corresponding EP Application No. 11151854.4.
Office Action dated Jun. 24, 2013 for corresponding CN Application No. 201110150390.7.
Notice of Allowance dated Feb. 28, 2013 for corresponding KR Application No. 10-2011-0020442.

*Primary Examiner* — Helen O Conley
(74) *Attorney, Agent, or Firm* — Knobbe Martens Olson & Bear LLP (57) ABSTRACT

A battery tray for storing a battery comprises: a battery storage unit comprising: a first side and a second side facing each other, and a third side and a fourth side facing each other, wherein the third and fourth sides have planar portions for accommodating a prismatic battery cell and round portions for accommodating a cylindrical battery cell; a first guiding unit extending from a lower portion of the third side to secure a first end of a prismatic battery cell; and a second guiding unit extending from a lower portion of the fourth side to secure a second end of a prismatic battery cell.

22 Claims, 7 Drawing Sheets

BATTERY STORAGE TRAY

CROSS-REFERENCE TO RELATED APPLICATIONS

This application claims priority to and the benefit of U.S. Provisional Application No. 61/352,287, filed on Jun. 7, 2010, the entire content of which is incorporated herein by reference.

BACKGROUND

1. Field

Aspects of the present invention relate to a battery storage tray.

2. Description of the Related Technology

Rechargeable batteries, which can be repeatedly charged and are small-sized, large-capacity batteries, are typically used as power sources for various portable electronic devices, such as notebook computers, camcorders, cellular phones, etc.

In the manufacture of a rechargeable battery, the battery typically subjected to an aging process to effectuate its capability as a proper battery. The aging process is typically a process for charging a rechargeable battery immediately after the rechargeable battery is formed. At this stage, the rechargeable battery typically generates an electrochemical energy by electrical energy supplied thereto.

The aging process is typically performed on a plurality of rechargeable batteries. To this end, a tray for storing the plurality of rechargeable batteries is required.

SUMMARY

According to one aspect of the present invention, a battery tray for storing a battery comprises: a battery storage unit comprising: a first side and a second side facing each other, and a third side and a fourth side facing each other, wherein the third and fourth sides have planar portions for accommodating a prismatic battery cell and round portions for accommodating a cylindrical battery cell; a first guiding unit extending from a lower portion of the third side to secure a first end of a prismatic battery cell; and a second guiding unit extending from a lower portion of the fourth side to secure a second end of a prismatic battery cell.

According to an embodiment, the battery storage tray includes a plurality of battery storage units.

According to an embodiment, the battery storage unit further comprises a through-hole at a lower surface of the battery tray to expose a terminal of a battery cell accommodated therein.

Since multiple types of batteries can be stored in a single battery storage unit, the manufacturing cost of battery storage trays according to embodiments can be reduced. Further, the storage space required for storing multiple types of battery storage trays can also be reduced.

DETAILED DESCRIPTION

Certain embodiments will now be described more fully hereinafter with reference to the accompanying drawings.

Figure 1:
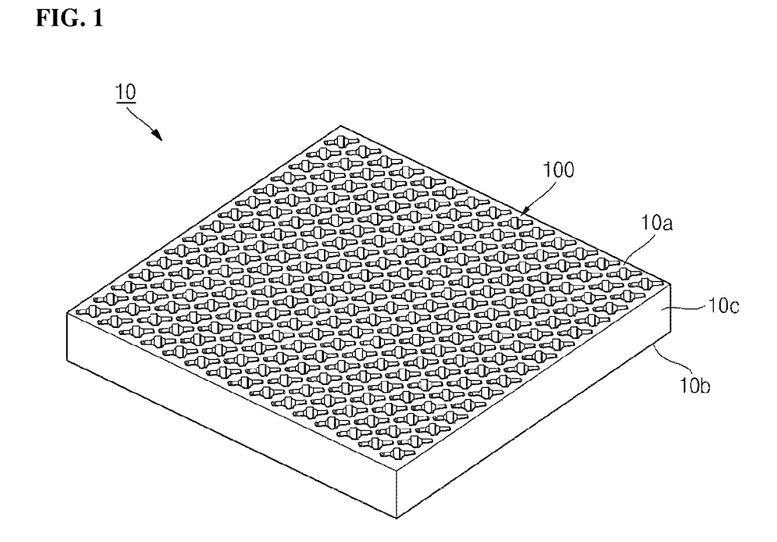
FIG. 1 is a perspective view of a battery storage tray according to an embodiment of the present invention.
Figure 2:
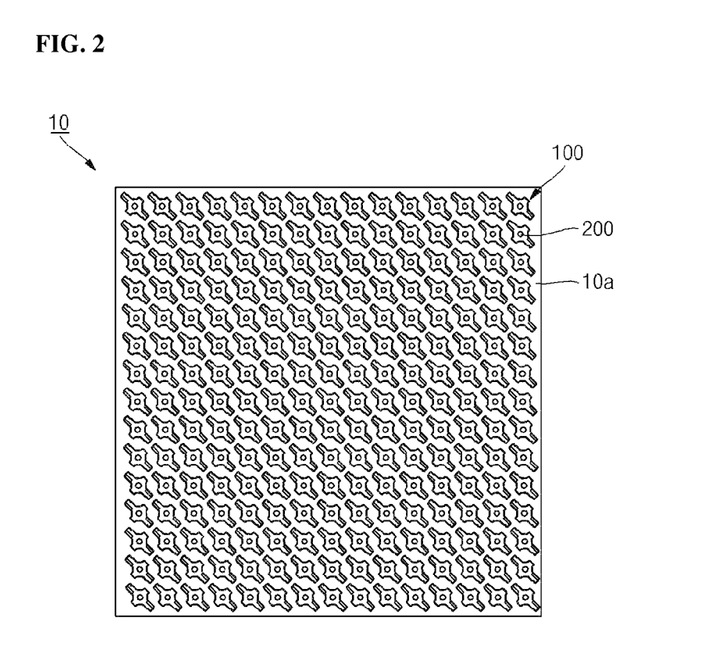
FIG. 2 is a plan view of the battery storage tray shown in FIG. 1.

FIG. 1 is a perspective view of a battery storage tray according to an embodiment of the present invention, and FIG. 2 is a plan view of the battery storage tray shown in FIG. 1.

Referring to FIG. 1, the battery storage tray 10 may be formed of an injection mold having a substantially hexagonal shape, and may include a first surface 10a, a second surface 10b opposite to the first surface 10a, and a third surface 10c connecting the first surface 10a and the second surface 10b.

Referring to FIG. 2, the battery storage tray according to an embodiment 10 includes a battery storage unit 100 in which a battery is received through the first surface 10a, and a through-hole 200 is formed at a predetermined area of the second surface 10b, the predetermined area corresponding to the battery storage unit 100. The battery storage tray 10 can store a plurality of batteries to be used for an aging process. Accordingly, a plurality of battery storage units 100 may be provided in the battery storage tray 10. The aging process may be a process for charging batteries before shipment, and may be performed by making probe pins contact an electrode terminal of a battery exposed through an upper part of the battery storage unit 100 and another electrode terminal of the battery exposed through the through-hole 200, and by applying a charging current to the respective electrode terminals. Embodiments of the invention will next be described with regard to one battery storage unit among the plurality of battery storage units 100 constituting the battery storage tray 10.

Figure 3:
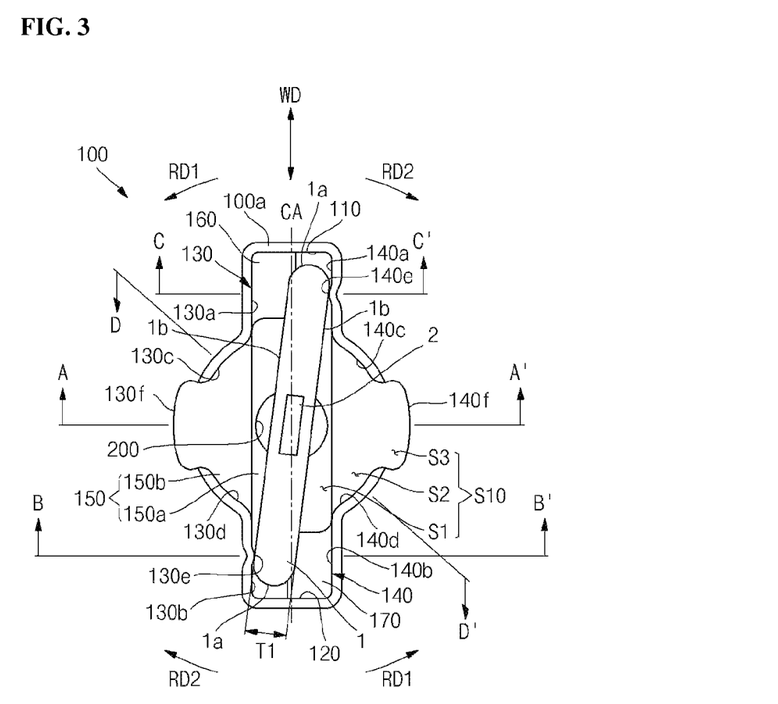
FIG. 3 is an enlarged plan view illustrating a state in which a first prismatic battery is stored in a single battery storage unit shown in FIG. 2.
Figure 4:
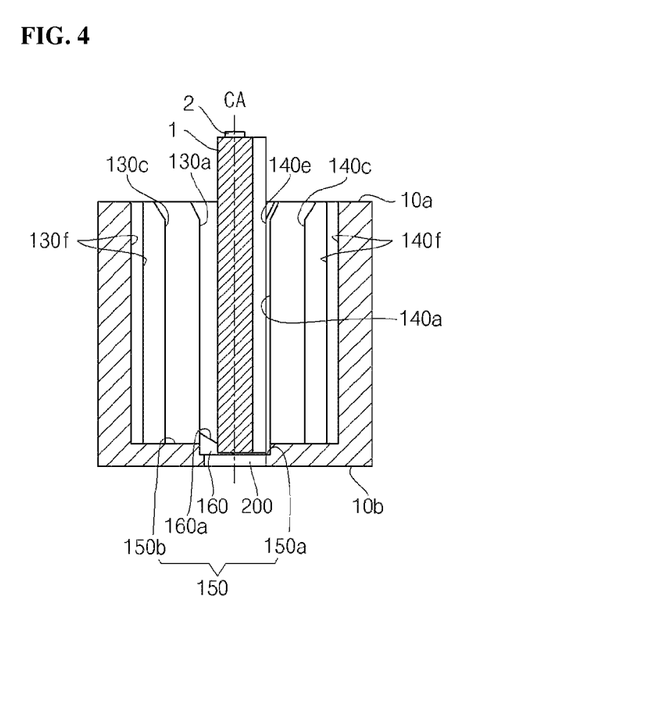
FIG. 4 is a cross-sectional view of the battery storage unit taken along the line A-A' of FIG. 3.
Figure 5:
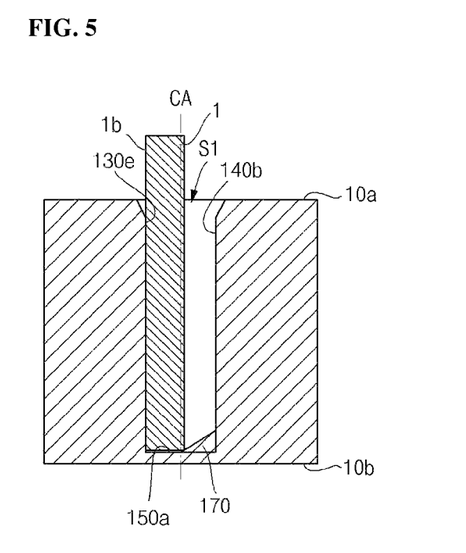
FIG. 5 is a cross-sectional view of the battery storage unit taken along the line B-B' of FIG. 3.
Figure 6:
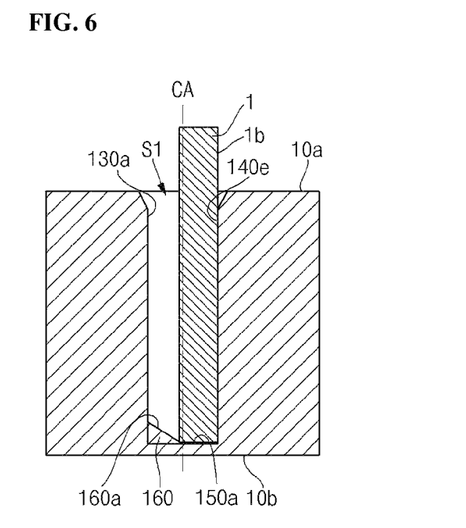
FIG. 6 is a cross-sectional view of the battery storage unit taken along the line C-C' of FIG. 3.
Figure 7:
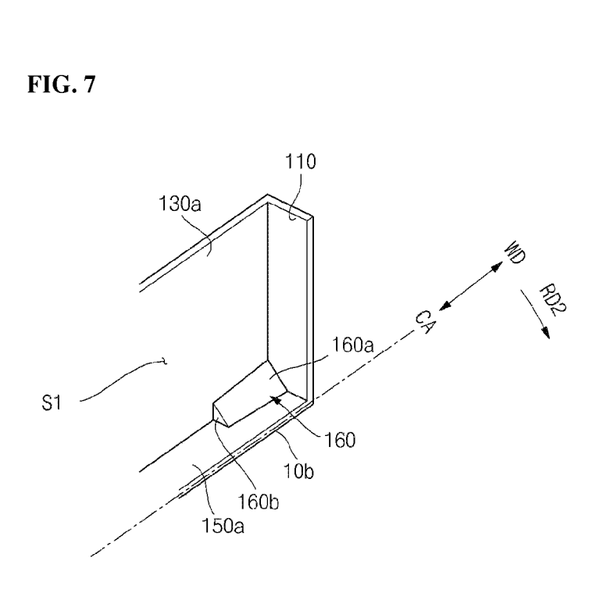
FIG. 7 is a perspective view of a first guide unit of the battery storage unit shown in FIG. 3.

FIG. 3 is an enlarged plan view illustrating a state in which a first prismatic battery is stored in a single battery storage unit shown in FIG. 2, FIG. 4 is a cross-sectional view of the battery storage unit taken along the line A-A' of FIG. 3, FIG. 5 is a cross-sectional view of the battery storage unit taken along the line B-B' of FIG. 3, FIG. 6 is a cross-sectional view of the battery storage unit taken along the line C-C' of FIG. 3, and FIG. 7 is a perspective view of a first guide unit of the battery storage unit shown in FIG. 3.

Referring to FIG. 3, the battery storage unit 100 may provide a space S10 in which a battery is stored. In detail, the battery storage unit 100 may include a first space S1 having a substantially rectangular shape, in which a prismatic battery is stored, a second space S2 having a substantially cylindrical shape, in which a cylindrical battery is stored, and a third space S3 in which a holding device for holding the prismatic battery or the cylindrical battery is entered. Herein, the prismatic battery is defined as a battery having a plane shape such as square, rectangular, oval and so on. In order to facilitate storage of the prismatic battery or the cylindrical battery, the battery storage unit 100 may include a taper surface 100a formed on the upper portion of the space S10. To form the space S10, the battery storage unit 100 may include a first side surface 110, a second side surface 120, a third side surface 130, a fourth side surface 140, and a bottom surface 150. In addition, the battery storage unit 100 may include a first guide unit 160 and a second guide unit 170 to guide and arrange multiple types of prismatic batteries (for example, prismatic batteries having different thicknesses) stored in the space S10.

The first side surface 110 and the second side surface 120 may face each other with a prismatic battery, for example, a first prismatic battery 1 having a first thickness T1 stored in the first space S1, interposed therebetween, and may be formed to be planar. The first side surface 110 and the second side surface 120 can restrict the first prismatic battery 1 from moving in a width direction WD. Here, the first thickness T1 may be, for example, 4 mm. Meanwhile, the first prismatic battery 1 may include a top surface from which the electrode terminal 2 protrudes, a side surface having a round portion 1a and a planar portion 1b, and a bottom surface opposite the top surface. The first side surface 110 and the second side surface 120 may face approximately the round portion 1a of the side surface of the first prismatic battery 1.

The third side surface 130 and the fourth side surface 140 may connect the first side surface 110 and the second side surface 120, and face each other with the first prismatic battery 1 interposed therebetween. In detail, the third side surface 130 and the fourth side surface 140 face approximately the planar portion 1b of the side surface of the first prismatic battery 1. The third side surface 130 and the fourth side surface 140 can restrict the first prismatic battery 1 from moving in rotation directions RD1 and RD2.

In detail, the third side surface 130 may include first planar portions 130a and 130b, first round portions 130c and 130d, a first protruding portion 130e, and a first holding portion 130f. The first planar portions 130a and 130b may be connected to a first end of the first side surface 130 and a first end of the second side surface 140, respectively, and may be formed approximately at right angles with respect to the first side surface 130 and the second side surface 140. In addition, the first planar portions 130a and 130b may be formed to be planar. The first round portions 130c and 130d may extend from the first planar portions 130a and 130b and extend outwardly from the central axis CA to have round shapes. The first protruding portion 130e may be formed in such a manner that a portion of the first planar portion 130b protrudes toward the first prismatic battery 1. The first holding portion 130f may be connected between the first round portion 130c and the first round portion 130d, and have a round shape protruding outwardly from the central axis CA further than the first round portions 130c and 130d. The taper surface 100a may not be formed at a portion of the upper portion of the battery storage unit 100 corresponding to the first holding portion 130f.

In detail, the fourth side surface 140 may include second planar portions 140a and 140b, second round portions 140c and 140d, a second protruding portion 140e, and a second holding portion 140f. The second planar portions 140a and 140b may be connected to a second end of the first side surface 110 and a second end of the second side surface 120, respectively, and may be formed approximately at right angles with respect to the first side surface 110 and the second side surface 120. In addition, the second planar portions 140a and 140b may be formed to be planar. The second round portions 140c and 140d may extend from the second planar portions 140a and 140b and may be symmetrical with the first round portions 130c and 130d about the central axis CA. The second protruding portion 140e may be formed in such a manner that a portion of the second planar portion 140b may protrude toward the first prismatic battery 1, and face the first protruding portion 130e in a diagonal direction. The second holding portion 140f may be connected between the second round portion 140c and the second round portion 140d, and may be symmetrical to the first holding portion 130f about the central axis CA. The taper surface 100a may not be formed at a portion of the upper portion of the battery storage unit 100 corresponding to the second holding portion 140f.

The bottom surface 150 may connect the first side surface 110, the second side surface 120, the third side surface 130 and the fourth side surface 140 to one another. In detail, the bottom surface 150 may include a first bottom surface 150a and a second bottom surface 150b. The first bottom surface 150a can face the bottom surface of the first prismatic battery 1 stored in the first space S1. The second bottom surface 150b may contact the bottom surface of a cylindrical battery (5 of FIG. 10) stored in the second space S2 and may extend to an area corresponding to the third space S3. The second bottom surface 150b may be positioned higher than the first bottom surface 150a.

As described above, the first side surface 110, the second side surface 120, the first planar portions 130a and 130b, the second planar portions 140a and 140b, and the first bottom surface 150a can form the first space S1 in which the first prismatic battery 1 is stored. Here, the first prismatic battery 1 having the first thickness T1 may be stored in the first space S1 while rotating in the rotation direction RD2. As shown in FIGS. 5 and 6, the first protruding portion 130e and the second protruding portion 140e may come into contact with the side surface of the first prismatic battery 1. In detail, the first protruding portion 130e and the second protruding portion 140e may come into line contact or point contact with an area right before the round portion 1a of the planar portion 1b that is a partial portion of the side surface of the first prismatic battery 1. The first protruding portion 130e and the second protruding portion 140e can support and fix the first prismatic battery 1.

As shown in FIG. 7, the first guide unit 160 may be formed to protrude on the first bottom surface 150a so as to come into contact with lower parts of the first planar portion 130a and the first side surface 110. In detail, the first guide unit 160 may include a first guide inclined surface 160a and a first guide side surface 160b.

The first guide inclined surface 160a may be a surface inclined in directions of the central axis CA and the first bottom surface 150a at the lower part of the first planar portion 130a spaced apart from the first bottom surface 150a. The first guide inclined surface 160a may be in contact with the first planar portion 130a and the first bottom surface 150a.

In addition, the farther from the first prismatic battery 1 in the width direction WD of the first prismatic battery 1, the wider the first guide inclined surface 160a can become.

The first guide side surface 160b may be connected to the first guide inclined surface 160a, the first planar portion 130a, and to the first bottom surface 150a.

When the first prismatic battery 1 is rotationally inserted into the first space S1, the first guide unit 160 can guide the first prismatic battery 1 to rotate in the rotation direction RD2 by the first guide inclined surface 160a. In addition, the first guide unit 160 can fix the first prismatic battery 1 by the first guide inclined surface 160a so as to prevent the rotated first prismatic battery 1 from moving.

The second guide unit 170 may be formed to protrude on the first bottom surface 150a so as to come into contact with lower parts of the second planar portion 140b of the fourth side surface 140 and the second side surface 120. Since the second guide unit 170 can be shaped to be symmetrical with the first guide unit 160 about the central axis CA in a diagonal direction, detailed description thereof will not be given. The second guide unit 170 can guide rotation of the first prismatic battery 1 in the rotation direction RD2 in cooperation with the first guide unit 160 when the first prismatic battery 1 is rotationally inserted into the first space S1. In addition, the second guide unit 170 can fix the first prismatic battery 1 in cooperation with the first guide unit 160 so as to prevent the rotated first prismatic battery 1 from moving.

Next, an embodiment in which a second prismatic battery 3 having a second thickness T2 is stored in the aforementioned battery storage unit 100 will be described.

Figure 8:
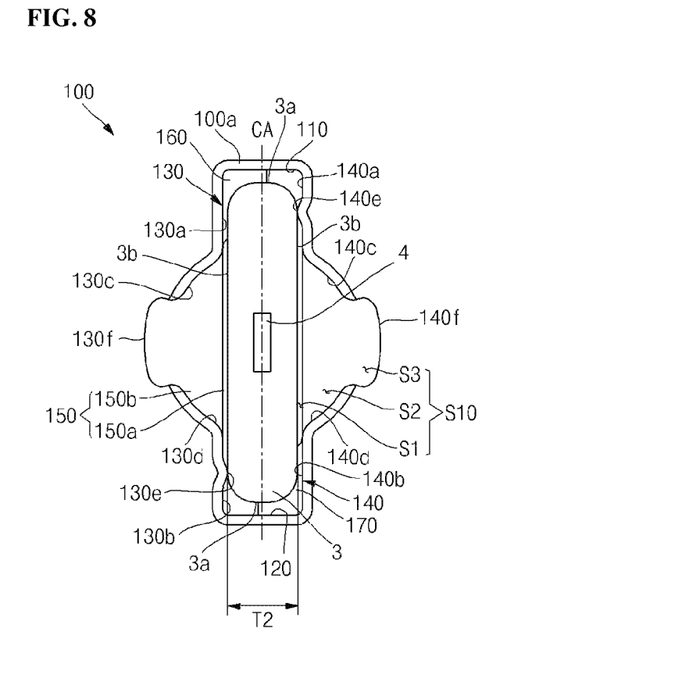
FIG. 8 is an enlarged plan view illustrating a state in which a second prismatic battery is stored in a single battery storage unit shown in FIG. 2.

FIG. 8 is an enlarged plan view illustrating a state in which a second prismatic battery is stored in a single battery storage unit shown in FIG. 2.

Referring to FIG. 8, the second prismatic battery 3 having a second thickness T2 can include a top surface from which the electrode terminal 4 protrudes, a side surface having a round portion 3a and a planar portion 3b, and a bottom surface opposite to the top surface. Here, the second thickness T2 of the second prismatic battery 3 may be greater than the first thickness T1 of the first prismatic battery 1. The second thickness T2 of the second prismatic battery 3 may be, for example, 7 mm. The second prismatic battery 3 may be stored in the first space S1 without being rotated. Thus, it is understood that prismatic batteries having different thicknesses can be stored in the first space S1 with different rotation rates. Meanwhile, since a connection relationship between each of the first protruding portion 130e and the second protruding portion 140e and the second prismatic battery 3 is the same as that between each of the first protruding portion 130e and the second protruding portion 140e and the first prismatic battery 1, detailed description thereof will not be given.

The positional relationship between each of the first prismatic battery 1 and the second prismatic battery 3 and the first guide unit 160 will now be described.

Figure 9:
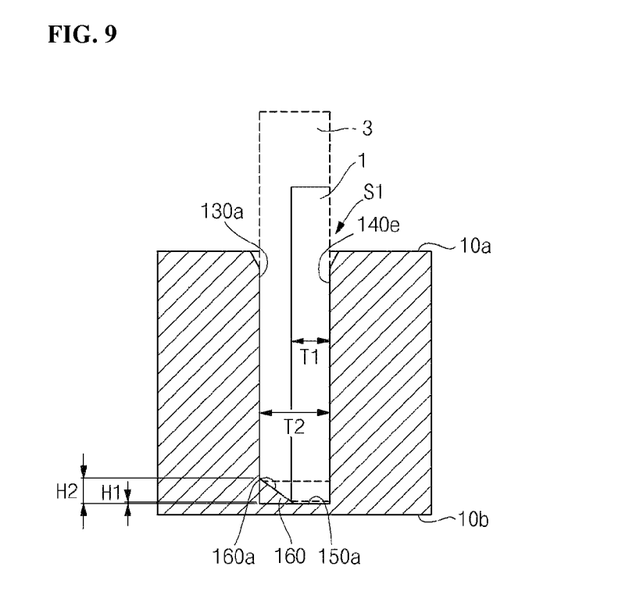
FIG. 9 is a cross-sectional view illustrating a positional relationship between each of the first and second prismatic batteries and the first guide unit shown in FIG. 3.

FIG. 9 is a cross-sectional view illustrating the positional relationship between each of the first and second prismatic batteries and the first guide unit shown in FIG. 3.

Referring to FIG. 9, the first prismatic battery 1 having the first thickness T1 can rotationally move to the lower part of the first guide inclined surface 160a by the first guide inclined surface 160a of the first guide unit 160 to then be positioned at a first height H1 from the first bottom surface 150a. By contrast, the second prismatic battery 3 having the second thickness T2 does not rotationally move along the inclined surface 160a of the first guide unit 160, so that it is positioned at a second height H2 from the first bottom surface 150a. From this perspective, it can be easily appreciated that the smaller the thickness of a prismatic battery, the more the prismatic battery can rotationally rotate along the inclined surface 160a of the first guide unit 160.

Although not shown in the drawing, the positional relationship between each of the first prismatic battery 1 and the second prismatic battery 3 and the second guide unit 170 may be the same as that between each of the first prismatic battery 1 and the second prismatic battery 3 and the first guide unit 160.

Next, an embodiment in which a cylindrical battery 5 is stored in the single battery storage unit 100 shown in FIG. 2 will be described.

Figure 10:
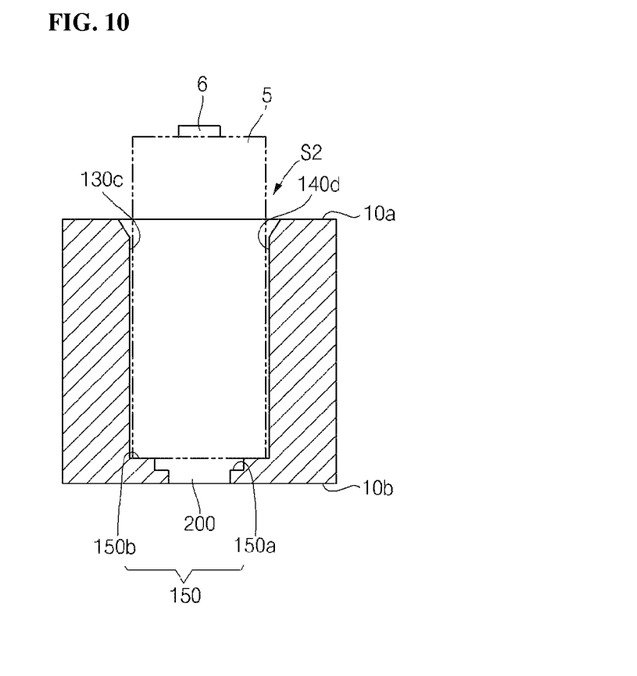
FIG. 10 is a cross-sectional view of the battery storage unit taken along the line D-D' of FIG. 3 in a state in which a cylindrical battery is stored in the single battery storage unit shown in FIG. 2.

FIG. 10 is a cross-sectional view of the battery storage unit taken along the line D-D' of FIG. 3 in a state in which a cylindrical battery is stored in a single battery storage unit shown in FIG. 2.

Referring to FIG. 10, the cylindrical battery 5 having a top surface from which an electrode terminal 6 protrudes may be stored in the second space S2. The second space S2 may be formed by the first round portions 130c and 130d, the second round portions 140c and 140d and the second bottom surface 150b, which are shown in FIG. 3.

As described above, the battery storage tray 10 according to an embodiment of the present invention includes the battery storage unit 100 providing the first space S1 in which the first guide unit 160 and the second guide unit 170 are formed, and the second space S2, thereby storing multiple types of batteries, that is, prismatic batteries having different thicknesses as well as a cylindrical battery, in a single battery storage unit 100.

Therefore, the battery storage tray 10 according to an embodiment of the present invention can reduce the manufacturing cost of the battery storage tray required by battery type and reduce the storage space required for storing multiple types of battery storage trays.

Next, a battery storage tray according to another embodiment of the present invention will be described.

Figure 11:
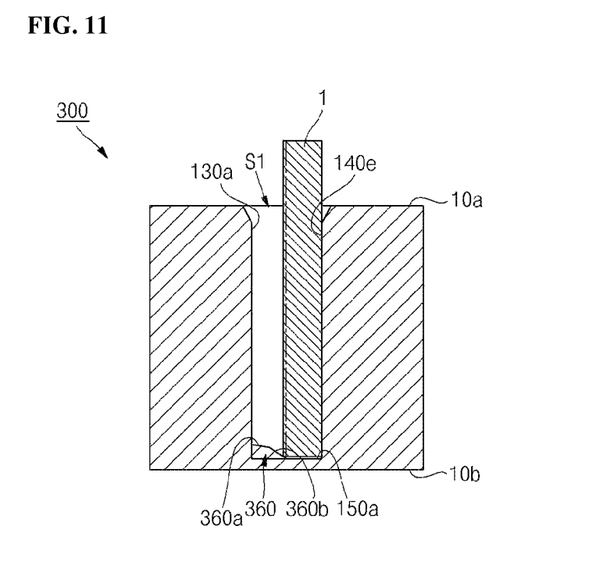
FIG. 11 is a cross-sectional view illustrating a portion of a battery storage tray according to another embodiment of the present invention, the portion corresponding to the battery storage tray portion shown in FIG. 6.
Figure 12:
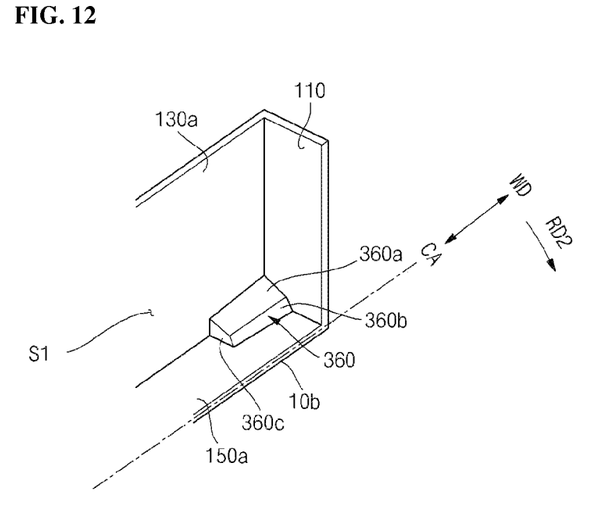
FIG. 12 is a perspective view of a first guide unit of the battery storage unit shown in FIG. 11.

FIG. 11 is a cross-sectional view illustrating a portion of a battery storage tray according to another embodiment of the present invention, the portion corresponding to the battery storage tray portion shown in FIG. 6. FIG. 12 is a perspective view of a first guide unit of the battery storage unit shown in FIG. 11.

The battery storage tray according to another embodiment of the present invention has substantially the same configuration and functions as those of the battery storage tray 10 according to an embodiment, except for the configuration of a first guide unit 360 of a battery storage unit 300. Thus, the battery storage tray according to the present embodiment will be described with emphasis on the first guide unit 360 of the battery storage unit 300.

Referring to FIGS. 11 and 12, the first guide unit 360 of the battery storage unit 300 may be formed to protrude on a first bottom surface 150a so as to come into contact with lower parts of a first planar portion 130a and a first side surface 110. The first guide unit 360 of the battery storage unit 300 may be similar to the first guide unit 160 of the battery storage unit 100, except that it has two inclined surfaces. In detail, the first guide unit 360 may include a first guide inclined surface 360a, a second inclined surface 360b, and a first guide side surface 360c.

The first inclined surface 360a may be a surface inclined in directions of the central axis CA and the first bottom surface 150a at the lower part of the first planar portion 130a spaced apart from the first bottom surface 150a. The first guide inclined surface 360a may be in contact with the first planar portion 130a but may not be in contact with the first bottom surface 150a. In addition, the farther from the first prismatic battery 1 in the width direction WD of the first prismatic battery 1, the wider the first guide inclined surface 160a becomes.

The second inclined surface 360b may be an inclined surface connecting the first inclined surface 360a and the first bottom surface 150a. The farther from the first prismatic battery 1 in the width direction WD of the first prismatic battery 1, the wider the second inclined surface 360b can become. According to embodiments, the second inclined surface 360b has a slope that is steeper than that of the first inclined surface 360a.

The first guide side surface 360c may be connected to the first inclined surface 360a, the second inclined surface 360b, the first planar portion 130a, and the first bottom surface 150a.

When the first prismatic battery 1 is rotationally inserted into the first space S1, the first guide unit 360 can guide the first prismatic battery 1 to rotate in a more secured, flexible manner by the first guide inclined surface 360a and the second inclined surface 360b. In addition, the first guide unit 360 can more securely fix the first prismatic battery 1 by the first guide inclined surface 360a or the second inclined surface 360b so as to prevent the rotated first prismatic battery 1 from moving. Here, the second inclined surface 360b can be advantageous for fixing a prismatic battery having a relatively small thickness.

Since a second guide unit (not shown) may be shaped to be symmetrical with the first guide unit 360 about the central axis CA in a diagonal direction, it is not illustrated in the drawing and a detailed description thereof will not be given. The second guide unit may function to guide rotation of the first prismatic battery 1 in a more secured, flexible manner in cooperation with the first guide unit 360 when the first prismatic battery 1 is rotationally inserted into the first space S1, and can more securely fix the rotated first prismatic battery 1 so as to prevent the first prismatic battery 1 from moving.

As described above, the battery storage tray according to another embodiment of the present invention may include the battery storage unit 300 providing the first space S1 in which the first guide unit 360 having two inclined surfaces and the second guide unit are formed, thereby storing prismatic batteries having different thicknesses in a single battery storage unit 300 in a more secured, flexible manner.

Next, a battery storage tray according to another embodiment of the present invention will be described.

Figure 13:
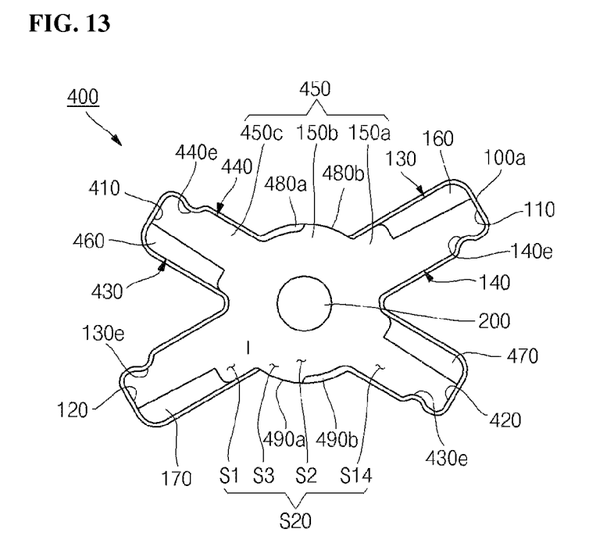
FIG. 13 is a plan view illustrating a portion of a battery storage tray according to still another embodiment of the present invention, the portion corresponding to the battery storage tray portion shown in FIG. 3.

FIG. 13 is a plan view illustrating a portion of a battery storage tray according to another embodiment of the present invention, the portion corresponding to the battery storage tray portion shown in FIG. 3.

The battery storage tray according to another embodiment of the present invention has substantially the same configuration and functions as those of the battery storage tray 10, except that a battery storage unit 400 further includes a fourth space S14. Thus, the battery storage tray according to the present embodiment will be described with emphasis on the fourth space S14 of the battery storage unit 400.

Referring to FIG. 13, the battery storage unit 400 can provide a space S20 in which a battery is stored. In detail, the battery storage unit 400 may include a first space S1 having a substantially rectangular shape, in which a prismatic battery is stored, a second space S2 having a substantially cylindrical shape, in which a cylindrical battery is stored, a third space S3 in which a holding device for holding the prismatic battery or the cylindrical battery is entered, and a fourth space S14 having a substantially rectangular shape, in which another prismatic battery is stored. In order to facilitate storage of the prismatic battery or the cylindrical battery, the battery storage unit 100 may include a taper surface 100a formed on the upper portion of the space S20.

To form the space S20, the battery storage unit 400 may include a first side surface 110, a second side surface 120, a third side surface 130, a fourth side surface 140, a fifth side surface 410, a sixth side surface 420, a seventh side surface 430, an eighth side surface 440, and a bottom surface 450. The seventh side surface 430 may include a third protruding portion 430e, the eighth side surface 440 may include a fourth protruding portion 440e, and the bottom surface 450 may include a first bottom surface 150a, a second bottom surface 150b and a third bottom surface 450c. The fourth space S14 of the battery storage unit 400 and the first space S1 may intersect with each other and form substantially an 'X' shape. The fourth space S14 may be formed by the fifth side surface 410, the sixth side surface 420, the seventh side surface 430, the eighth side surface 440, and the third bottom surface 450c. The fifth side surface 410, the sixth side surface 420, the seventh side surface 430, the eighth side surface 440, and the third bottom surface 450c may have substantially the same configurations and functions as those of the first side surface 110, the second side surface 120, the third side surface 410, the fourth side surface 140, and the first bottom surface 150a forming the first space S1, except for their formed positions, and thus detailed descriptions thereof will not be given.

In addition, the battery storage unit 400 may include a first guide unit 160, a second guide unit 170, a third guide unit 460 and a fourth guide unit 470 to guide and arrange multiple types of prismatic batteries (for example, prismatic batteries having different thicknesses) stored in the space S20.

The third guide unit 460 and the fourth guide unit 470 may be formed on the third bottom surface 450c. The third guide unit 460 and the fourth guide unit 470 may have substantially the same configurations and functions as those of the first guide unit 160 and the second guide unit 170 formed on the first bottom surface 150a, except for their formed positions, and thus detailed descriptions thereof will not be given.

The third side surface 130 and the eighth side surface 440 may be connected by first round portions 480a and 480b. In addition, the fourth side surface 140 and the seventh side surface 430 may be connected by second round portions 490a and 490b. A taper surface 100a may not be formed at areas of an upper part of the battery storage unit 400 corresponding to the first round portion 480b and the second round portion 490b.

According to embodiments, the first side surface 110, the second side surface 120, the third side surface 130, and the fourth side surface 140 are sized to accommodate a prismatic battery cell having a first length, while the fifth side surface 410, the sixth side surface 420, the seventh side surface 430 and the eighth side surface 440 are sized to accommodate a prismatic battery cell having a second length.

As described above, the battery storage tray according to still another embodiment of the present invention includes the battery storage unit 400 providing the first space S1 and the fourth space S14 for storing prismatic batteries, thereby storing multiple types of batteries in a single battery storage unit 400 in more various manners.

Although the present invention has been described with reference to certain embodiments thereof, it will be understood by those skilled in the art that a variety of modifications and variations may be made to the present invention without departing from the spirit or scope of the present invention defined in the appended claims, and their equivalents.

What is claimed is:

1. A battery tray for storing a battery comprising:
a battery storage unit comprising:
- a first side and a second side facing each other, and a third side and a fourth side facing each other, wherein the third and fourth sides have planar portions that are so dimensioned to accommodate a prismatic battery cell and round portions that are so dimensioned to accommodate a cylindrical battery cell wherein the round portions of the third and fourth sides are separated by a distance that is greater than the distance separating the planar portions of the third and fourth sides;
- a first guiding unit extending from a lower portion of the third side to secure a first end of a prismatic battery cell; and
- a second guiding unit extending from a lower portion of the fourth side to secure a second end of a prismatic battery cell wherein the first guiding unit is sized and positioned to be interposed between a first end of the prismatic battery and the third side wall and is sized so that the first end of the prismatic battery is positioned against the fourth side wall and paced from the third side wall and the second guiding unit is sized and positioned to be interposed between a second end of the prismatic battery and the fourth side wall and is sized so that the second end of the prismatic battery is positioned against the third side wall and spaced from the fourth side wall.

2. The battery tray of claim 1, wherein the first side is connected to the third and fourth sides on one end of the third and fourth sides, and the second side is connected to the third and fourth sides on an opposite end of the third and fourth sides.

3. The battery tray of claim 1, wherein the third and fourth sides further comprise edges extending from the round portions for accommodating a device for holding a battery cell.

4. The battery tray of claim 1, wherein the first guiding unit further extends from a lower portion of the first side and a first bottom surface, and the second guiding unit further extends from a lower portion of the second side and the first bottom surface.

5. The battery tray of claim 1, wherein the first guiding unit is configured to secure a first end of a prismatic battery cell with a surface of the fourth side, and the second guiding unit is configured to secure a second end of a prismatic battery cell with a surface of the third side.

6. The battery tray of claim 5, comprising a protrusion at the surface of the fourth side configured to contact a first end of a prismatic battery cell, and a protrusion at the surface of the third side configured to contact a second end of a prismatic battery cell.

7. The battery tray of claim 1, wherein the first guiding unit comprises a first surface extending downward from the third side towards a prismatic battery cell to be accommodated in the battery storage unit, and the second guiding unit comprises a first surface extending downward from the fourth side towards a prismatic battery cell to be accommodated in the battery storage unit.

8. The battery tray of claim 7, wherein the first guiding unit comprises a second surface extending downward from an end of the first surface of the first guiding unit, and the second guiding unit comprises a second surface extending downward from an end of the first surface of the second guiding unit.

9. The battery tray of claim 8, wherein the second surfaces of the first and second guiding units have slopes steeper than slopes of the first surfaces of the first and second guiding units.

10. The battery tray of claim 1, further comprising a first bottom surface connecting the first, second, third and fourth sides for accommodating a prismatic battery cell.

11. The battery tray of claim 10, further comprising a second bottom surface connecting the round portions of the third and fourth sides for accommodating a cylindrical battery cell.

12. The battery tray of claim 1, wherein the battery storage unit is sized to accommodate a prismatic battery cell having a thickness that is less than or equal to lengths of the first and second sides.

13. The battery tray of claim 12, wherein the battery storage unit is sized to accommodate a prismatic battery cell such that a lower portion of the battery cell contacts a surface of the first guiding unit and a surface of the second guiding unit.

14. The battery tray of claim 12, wherein the battery storage unit is sized to accommodate a prismatic battery cell such that a lower portion of the battery cell contacts a lower surface of the first guiding unit and a lower surface of the second guiding unit.

15. The battery tray of claim 12, wherein the battery storage unit is sized to accommodate a prismatic battery cell such that a lower portion of the battery cell lies over an upper surface of the first guiding unit and an upper surface of the second guiding unit.

16. The battery tray of claim 1, wherein the battery storage unit further comprises:
- a fifth side and a sixth side facing each other, and a seventh side and an eighth side facing each other, wherein the fifth side and one end of the seventh and eight sides extend generally from the third side, and wherein the sixth side and an opposite end of the seventh and eight sides extend generally from the fourth side;
- a third guiding unit extending from a lower portion of the seventh side to secure a first end of a prismatic battery cell; and
- a fourth guiding unit extending from a lower portion of the eighth side to secure a second end of a prismatic battery cell.

17. The battery tray of claim 16, wherein the seventh and eighth sides have planar portions for accommodating a prismatic battery cell, and share the round portions of the third and fourth sides for accommodating a cylindrical battery cell.

18. The battery tray of claim 16, wherein the first, second, third and fourth sides are sized to accommodate a prismatic battery cell having a first length, and wherein the fifth, sixth, seventh and eighth sides are sized to accommodate a prismatic battery cell having a second length.

19. The battery tray of claim 1, wherein the battery storage unit further comprises a through-hole at a lower surface of the battery tray to expose a terminal of a battery cell accommodated therein.

20. The battery tray of claim 1, further comprising a plurality of battery storage units.

21. The battery tray of claim 6, wherein the protrusion on the surface of the third side and the protrusion on the surface of the fourth side make line contact or point contact with planar portions of a prismatic battery cell.

22. The battery tray of claim 21, wherein the protrusion on the surface of the third side and the protrusion on the surface of the fourth side make line contact or point contact with the planar portions immediately adjacent to round portions at opposite ends of a prismatic battery cell.

* * * * *